United States Patent [19]

Albach et al.

[11] Patent Number: 5,514,942
[45] Date of Patent: May 7, 1996

[54] CIRCUIT ARRANGEMENT FOR POWERING CONTROL CIRCUITRY AND DRIVING AN INDUCTIVE LOAD FROM A SINGLE DC SOURCE

[75] Inventors: Manfred Albach; Theo Hüsgen, both of Aachen, Germany

[73] Assignee: U.S. Philips Corporation, New York, N.Y.

[21] Appl. No.: 149,493

[22] Filed: Nov. 9, 1993

[30] Foreign Application Priority Data

Nov. 10, 1992 [DE] Germany ............................ 42 37 843.5

[51] Int. Cl.$^6$ ........................................................ H02P 1/00
[52] U.S. Cl. ............................................................ 318/724
[58] Field of Search ........................... 318/700, 72, 715, 318/716, 719, 724, 738, 739, 741, 799–815, 254, 439, 138; 363/41, 37, 45, 17, 98, 132; 307/64–67, 69, 75

[56] References Cited

U.S. PATENT DOCUMENTS

| | | | |
|---|---|---|---|
| 4,520,296 | 5/1985 | Lepper et al. ............................ | 318/254 |
| 4,920,475 | 4/1990 | Rippel ...................................... | 363/132 |
| 4,994,955 | 2/1991 | Schoofs et al. ........................ | 363/17 X |
| 5,017,800 | 3/1991 | Divan ....................................... | 307/66 |
| 5,142,238 | 8/1992 | White ....................................... | 330/9 |
| 5,291,383 | 3/1994 | Oughton .................................. | 363/17 |
| 5,365,118 | 11/1994 | Wilcox ..................................... | 327/109 |

FOREIGN PATENT DOCUMENTS

| | | |
|---|---|---|
| 3830016 | 8/1989 | Germany. |
| 0062074 | 5/1981 | Japan ............................. 363/41 |
| 1167320 | 10/1969 | United Kingdom. |

*Primary Examiner*—Jonathan Wysocki
*Attorney, Agent, or Firm*—Robert J. Kraus

[57] ABSTRACT

A circuit arrangement for driving an inductive load (M) having a first (1) and a second sub-winding (2), which sub-windings can be connected to an energy source (5) via switch devices (9, 10) periodically driven by a controller (16). The source produces a DC voltage (U5) to supply energy to the load (M). Alternatively, the sub-windings are coupled electrically (3) and magnetically (6) like an autotransformer, while voltages (for example U8) for feeding the controller (16) can be tapped from the transformer end terminals (7,8) which are formed by non-interconnected terminals of the sub-windings (1,2). In this circuit arrangement start and operation is ensured with the least possible additional circuitry even if the DC voltage taken from the energy source is less than the supply voltage necessary for the controller.

5 Claims, 2 Drawing Sheets 5,514,942

CIRCUIT ARRANGEMENT FOR POWERING CONTROL CIRCUITRY AND DRIVING AN INDUCTIVE LOAD FROM A SINGLE DC SOURCE

BACKGROUND OF THE INVENTION

The invention relates to a circuit arrangement for driving an inductive load, preferably, a synchronous motor, from an energy source which, in essence, produces a DC voltage.

From DE-OS 38 30 016 a circuit arrangement is known for feeding, via a DC voltage transformation circuit, a load from an energy source that has a low output voltage. The DC voltage transformation circuit periodically takes energy from the energy source via a main switch element and leads this energy to the load with an increased supply voltage via an inductive element and a rectifier. Furthermore, the arrangement comprises a start switch element through which energy for generating the supply voltage is taken from the energy source in a start phase of the circuit arrangement. This known circuit arrangement comprises a main controller which is supplied with energy directly from the supply voltage and which periodically controls the main switch element. This main controller thus has an increased supply voltage level compared with the output voltage of the energy source. Additionally, a start controller is provided which is directly and exclusively fed by the energy source and periodically controls the start switch element. The switch periods for the start switch element are then shorter than those for the main switch element. The start controller and thus the start switch element are switched off when the supply voltage reaches a given value.

In the known circuit arrangement the start switch element and the start controller ensure that when the circuit arrangement is taken into operation first a supply voltage of the required level for the main controller is generated to make the main switch element operative prior to its operation. Once the main controller and the main switch element have started operating, they take over the generation of the supply voltage which is also used for operating the main controller.

The known circuit arrangement can be used for any load and thus also for the feeding of motors. However, it has appeared that for a certain use a further simplification of the circuit arrangement, especially as regards the starting of the circuit arrangement when sections thereof are taken into operation, is desirable.

SUMMARY OF THE INVENTION

Accordingly, it is an object of the invention to provide a circuit arrangement for driving an inductive load from an energy source producing, in essence, a DC voltage, so that its operation and its start are ensured with minimum additional circuitry even if the DC voltage taken from the energy source is less than the supply voltage needed for a main controller, for example, according to the state of the art.

In accordance with the invention this object is achieved by a circuit arrangement for driving an inductive load, comprising at least one winding, each comprising at least a first and a second sub-winding, which sub-windings can, on the one hand, be alternately connected to an energy source via switch devices periodically driven by a controller, which source in essence produces a DC voltage to supply energy to the load and, on the other hand, are coupled electrically and magnetically in the form of an autotransformer, while voltages for feeding the controller can be tapped from the transformer end terminals which are formed by non-interconnected terminals of the sub-windings.

The circuit arrangement according to the invention is advantageous in that it utilizes an energy supply to feed the controller which ensures uninterrupted and reliable feeding in all types of operation i.e. in both the starting phase and permanent operation. This eliminates the necessity of having separate arrangements for the starting of the circuit arrangement. In contrast, the circuit arrangement according to the invention is designed to feed a load which has an inductive load portion that comprises, as has been described, at least one winding with at least two sub-windings. This is especially the case for electromotors, so that the circuit arrangement according to the invention represents a very simple, cost effective and thus advantageous solution to the realisation of inexpensive drives. The voltage for driving the controller may be twice the DC voltage produced by the energy source without causing any problem. The circuit arrangement according to the invention is therefore preferably suitable for feeding the described drives from energy sources having a low-level DC voltage, preferably battery, accumulators or the like.

The electric and magnetic coupling used according to the invention of the sub-windings in the form of an autotransformer can be arranged in such a way that the voltage applied by the energy source to one of the sub-windings via the magnetic coupling in the other sub-winding induces a voltage which, superimposed in a proper phase by the voltage in the first sub-winding, produces an enlarged ideally doubled voltage.

To this end, the sub-windings are electrically interconnected preferably by one of their terminals, each via a centre terminal which is connected to one pole of the energy source, whose second pole can be connected to one of the end terminals each via one of the switch devices. Both sub-windings in an embodiment of the inductive load as an electromotor, preferably as a synchronous motor, are fed so that they cause the rotor of this motor to present an equidirectional rotation when in operation. The mutual inductance of the two sub-windings is used for generating the voltages for feeding the controller.

Preferably, the voltages for feeding the controller are tapped from the end terminals via rectifier elements and smoothed in a storage capacitor bridging the controller. The combination of the rectifier elements and the storage capacitor may additionally be used to advantage for serving the purpose of attenuating the voltage peaks across the switch devices.

Since the controller comprised in the circuit arrangement according to the invention is supplied with a supply voltage that is larger than the DC voltage produced by the energy source, this controller may preferably comprise a timer circuit which is also designed for this high supply voltage. Advantageously, timer circuits of a standardized type may then be used for which, when selected, the low DC voltage level of the energy source does not cause any hindrance according to the invention.

A further simplification of the circuit arrangement according to the invention is achieved in that the switch device assigned to the second sub-winding serves as an inverting drive circuit for the switch device assigned to the first sub-winding. This saves on a separate inverting driver stage for driving the switch device assigned to the first sub-winding. On the one hand, this leads to a reduction of the number of components and thus of the size of the structure and manufacturing costs and, on the other hand, creates a larger selection option for the controller and the timer circuit comprised therein.

BRIEF DESCRIPTION OF THE DRAWING

Exemplary embodiments of the invention are represented in the drawing and will be further explained hereinafter, in which.

DESCRIPTION OF THE PREFERRED EMBODIMENTS

Figure 1:
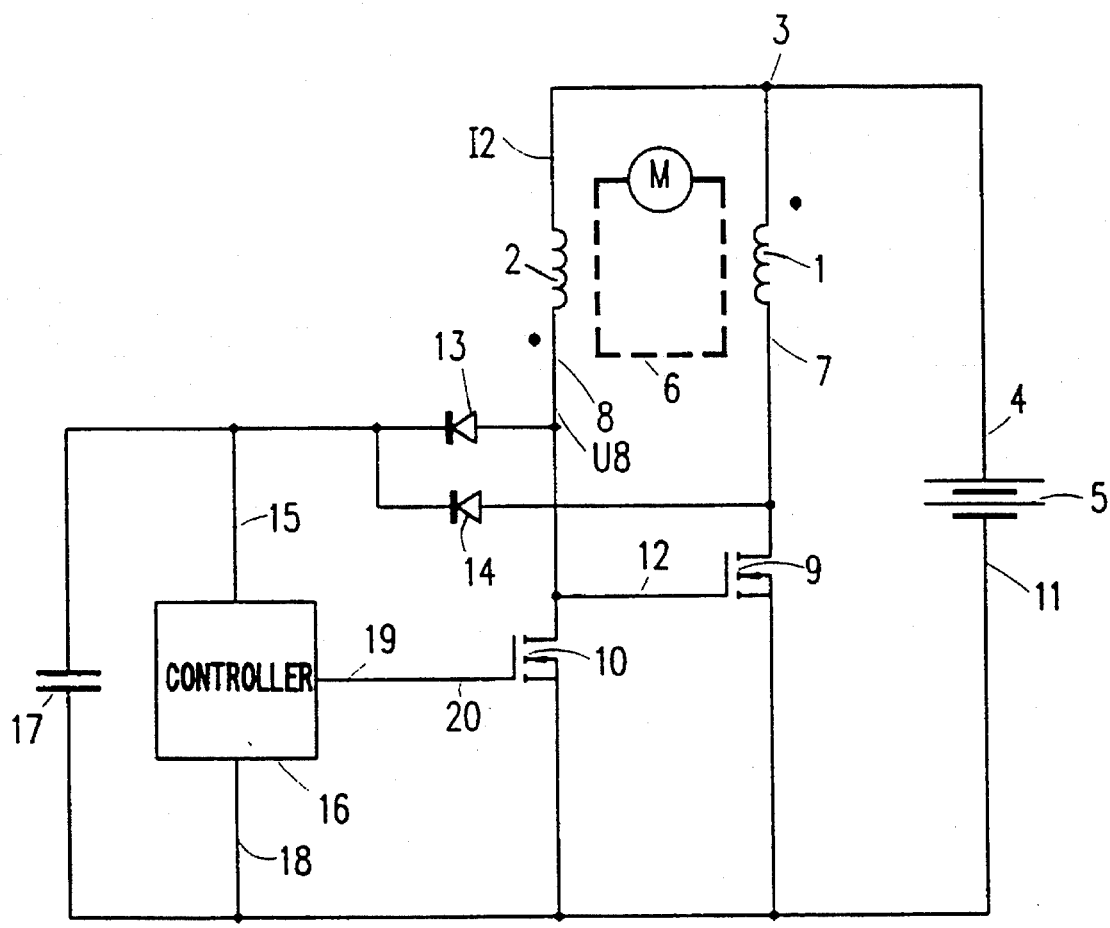
FIG. 1 shows a block diagram of a first exemplary embodiment for feeding a monophase synchronous motor.

In the exemplary embodiment shown in FIG. 1 two sub-windings 1, 2 together forming a centre tap winding of a synchronous motor M to be driven, are interconnected via a centre terminal 3 which is connected to the positive pole 4 of an energy source 5 which produces a DC voltage. The energy source is represented as a battery for simplicity, but may also have another structure. As a result of the magnetic negative feedback effected by the magnetic bodies 6 of the synchronous motor M the sub-windings 1, 2 of the synchronous motor M form an autotransformer whose end terminals are formed by two terminals 7 and 8 respectively, of the sub-windings 1 and 2 which terminals are turned away from the center terminal 3. The end terminal 7 assigned to the first sub-winding 1 can be connected to a negative pole 11 of the energy source 5 via the main current path of a first switch device 9, the end terminal 8 assigned to the second sub-winding 2 via the main current path of a second switch device 10. The switch devices 9, 10 are preferably arranged as MOS field effect transistors, but may alternatively be structured in a different way which ensures the desired switching function. In the example shown in FIG. 1 the terminals of the MOS field effect transistors 9 and 10 connected to the sub-windings 1 and 2 respectively, form the drain electrodes thereof, whereas the source terminals can be connected to the negative pole 11 of the energy source 5. A gate terminal of the MOS field effect transistor which forms the first switch device 9 represents a control terminal 12 of this first switch device 9 and is connected to the junction between the end terminal 8 of the second sub-winding 2 and the drain terminal of the second switch device 10. Also connected to this junction is the anode terminal of a first rectifier element 13, whose cathode terminal together with the cathode terminal of a second rectifier element is connected to a positive supply voltage terminal 15 of a controller 16 as well as a terminal of a storage capacitor 17. A second terminal of this storage capacitor 17 as well as a negative supply voltage terminal 18 of the controller 16 are connected to the negative pole 11 of the energy source 5. A control output 19 of the controller 16 is coupled to a control terminal 20 of the second switch device 10, in the case at hand being formed by a gate terminal of the MOS field effect transistor forming the second switch device 10. The anode terminal of the second rectifier element 14 is connected to the junction between the end terminal 7 of the first sub-winding 1 and the first switch device 9.

The MOS field effect transistors forming the two switch devices 9, 10 are arranged as so-termed "Logic-Level-MOSFETs" having a low threshold voltage and are dimensioned so that the D.C. voltage supplied by the energy source 5 is exactly enough for switching through the main current paths of the field effect transistors, so that a limited current may circulate in these main current paths. For example, the energy source 5 is arranged to be a nickel cadmium battery comprising two cells, which produces a nominal voltage of 2.4 V. The controller 16 comprises a timer circuit of the standardized type NE 555, which cannot yet be operated with a supply voltage of 2.4 V.

When the circuit arrangement is taken into operation, i.e. when the energy source 5 is connected to the rest of the circuit arrangement as shown in FIG. 1, the storage capacitor 17 is initially uncharged. The controller 16 is then not yet supplied with a supply voltage, so that it is not yet capable of presenting a control voltage at the control output 19. Consequently, the second switch device 10 remains blocked via the control terminal 20, at the end terminal 8 of the second sub-winding 2 a high voltage can build up the moment when the energy source 5 is switched on i.e. here the voltage produced by the energy source 5 occurs. This voltage is also applied to the control terminal 12 of the first switch device 9 and switches it to the conductive state. As a result, the first sub-winding 1 is supplied with the DC voltage delivered by the energy source 5. Since the first and second sub-windings 1, 2 form an autotransformer, a voltage corresponding to the ratio of the number of windings of the sub-winding 1 to those of sub-winding 2 is developed at the end terminal 8 of the second sub-winding 2 of this autotransformer. If the sub-windings 1, 2 have preferably identical dimensions, the voltage at the end terminal 8 of the second sub-winding 2 rises to twice the DC voltage level of the energy source 5 the moment the source is switched on. This voltage referenced U8 in FIG. 1 charges the storage capacitor 17 via the first rectifier element 13. As a result, there is now available at the terminals of the storage capacitor 17 and thus at the supply voltage terminals 15, 18 of the controller 16 a supply voltage by which the controller 16 and thus the timer circuit comprised therein are set into operation. Through its control output 19 the controller 16 periodically switches the second switch device 10 by its control terminal 20 to the conductive and the non-conductive state. Accordingly, the first switch device 9 is alternately switched to the non-conductive and conductive states in phase opposition. As a result, a current flows from the energy source 5 at the switching rate of the switch devices 9, 10 to feed the synchronous motor M alternately through the two sub-windings 1 and 2 respectively, so that the motor M is driven. At the end terminal 7, 8 assigned to the switch device 9, 10 respectively, either conductive or not, the magnetic coupling of the sub-windings 1, 2 which form an autotransformer during operation, again causes a high voltage pulse to occur in each switch period of the switch devices 9, 10. These voltage pulses are rectified by the rectifier elements 13, 14 and used for recharging the storage capacitor 17 and for feeding the controller 16.

Figure 2:
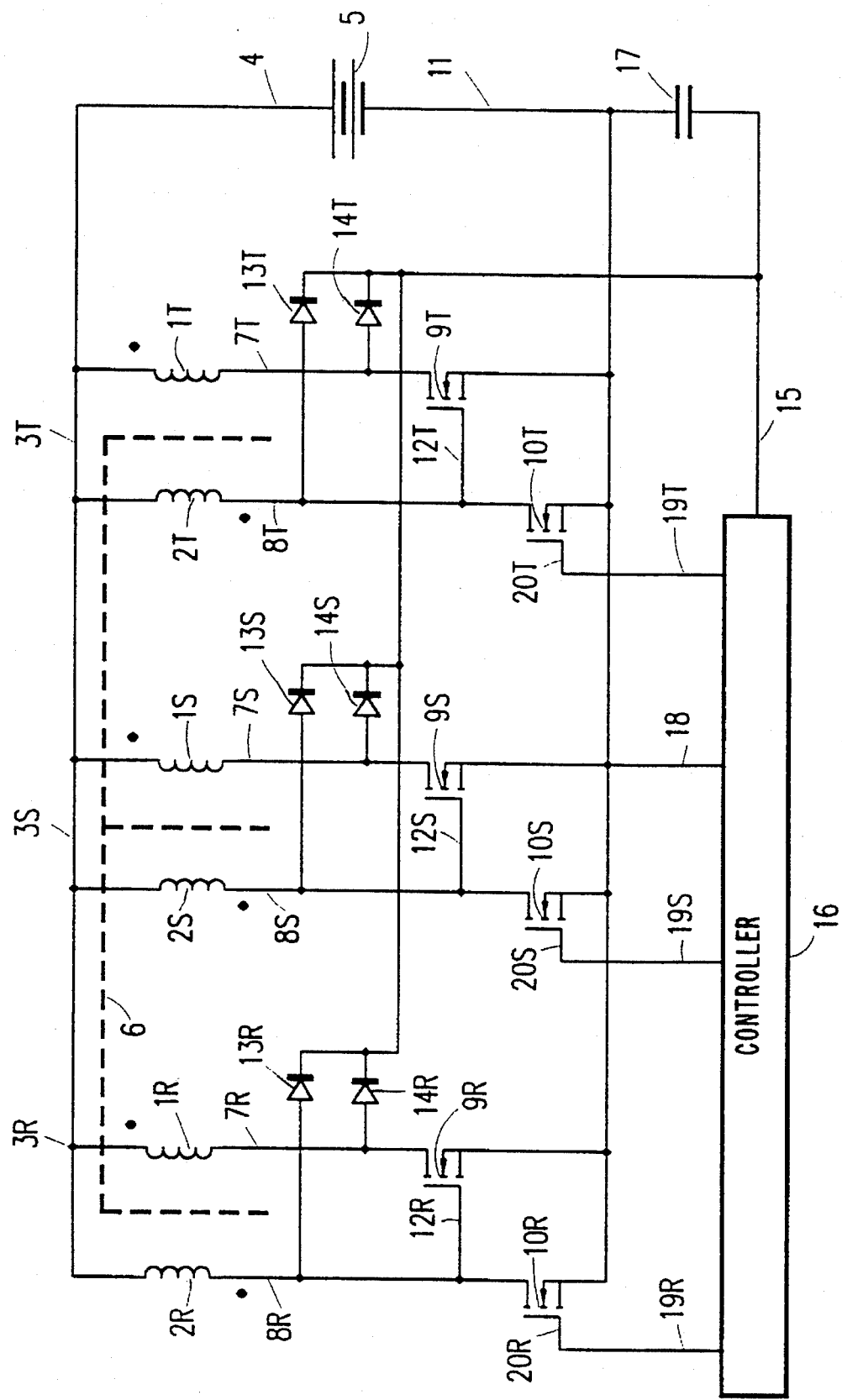
FIG. 2 shows an exemplary embodiment for feeding a three-phase synchronous motor.

A second embodiment for the invention which is similar to the first embodiment shown in FIG. 1 and shows a circuit arrangement for a three-phase synchronous motor is shown in FIG. 2. In that drawing Figure the components already described with reference to FIG. 1 carry like reference characters. The components of the circuit arrangement as shown in FIG. 2, which are found in threefold as compared to those shown in FIG. 1, have been completed by a letter R, S or T for the three phases R, S, and T of a three-phase motor (induction motor). In the exemplary embodiment shown in FIG. 2 three elements of the arrangement that can be learnt from FIG. 1 which comprises winding 1, 2, switch devices 9, 10, rectifier elements 13, 14 and storage capacitor 17 are connected in parallel to the energy source 5. Each second switch device 10R, 10S and 10T is supplied with control signals through control outputs 19R, 19S and 19T respectively, to drive in a proper phase relation the switch devices 9R, 9S, 9T, 10R, 10S and 10T respectively. To feed the controller 16 which supplies control signals to all three windings 1R, 2R, 1S, 2S, 1T, 2T respectively, according to FIG. 2 there is a shared storage capacitor 17 to which all the rectifier elements 13R, 13S, 13T, 14R, 14S, 14T are connected. The shared controller 16 may again comprise a standardized timer circuit for example of the NE 555 type which produces a pulse-shaped control voltage from which the control signals with the proper phase shift are produced for the three control outputs 19R, 19S and 19T respectively.

In a dimensional example an Ni—Cd battery comprising two cells and which has a total nominal voltage of 2.4 V was used as the energy source 5. This voltage ensures that a controller 16 comprising a standardized timer circuit NE 555 certainly starts.

We claim:

1. A circuit arrangement for driving an inductive load having first and second windings which are electrically connected and magnetically coupled to form an autotransformer having a common terminal which is common to electrically connected ends of the windings and first and second terminals electrically connected to the respective windings remotely from said ends, in said arrangement:

a. means is provided for electrically connecting the common terminal to a first pole of a DC power source;

b. the first terminal is electrically connected through a first switch means to means for electrical connectiion to a second pole of the DC power source, said first switch means having a control electrode for effecting switching between conductive and non-conductive states;

c. the second terminal is electrically connected through a second switch means to means for electrical connection to the second pole of the DC power source, said second switch means having a control electrode for effecting switching between conductive and non-conductive states;

d. the control electrodes are operatively coupled to a control means for alternately effecting switching of the first and second switching means into the respective conductive states;

e. the control means includes first and second power terminals for connection to a source of DC power;

f. the first power terminal is electrically connected through first and second rectifiers to the first and second terminals, respectively, of the autotransformer, said first rectifier providing current to said first power terminal when the second switching means is conducting and said second rectifier providing current to said first power terminal when the first switching means is conducting; and g. the second power terminal is electrically connected to a second pole of the DC power source.

2. A circuit arrangement as in claim 1 where the control means operates at a DC voltage which is larger than a voltage provided by the DC power source and where the windings are wound such that current flowing through the first winding when the first switch means is conducting will induce a voltage at the second terminal which is substantially larger than said voltage provided by said DC power source.

3. A circuit arrangement as in claim 1 or 2 including capacitive means electrically connected between the first and second power terminals.

4. A circuit arrangement as in claim 1 or 2 where the control electrodes are operatively connected to the control means by electrically connecting said control electrode of the first switch means to the second terminal and by electrically connecting said control electrode of the second switch means to said control means.

5. A circuit arrangement as in claim 1 or 2 where the inductive load comprises a synchronous motor.

\* \* \* \* \*